US010856058B2

(12) United States Patent
Bottari et al.

(10) Patent No.: US 10,856,058 B2
(45) Date of Patent: *Dec. 1, 2020

(54) SWITCHING DATA SIGNALS OF AT LEAST TWO TYPES FOR TRANSMISSION OVER A TRANSPORT NETWORK PROVIDING BOTH BACKHAUL AND FRONTHAUL (XHAUL) CONNECTIVITY

(71) Applicant: Telefonaktiebolaget LM Ericsson (publ), Stockholm (SE)

(72) Inventors: Giulio Bottari, Pisa (IT); Fabio Cavaliere, Pisa (IT); Stefano Ruffini, Pisa (IT); Stefano Stracca, Pisa (IT)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/289,615

(22) Filed: Feb. 28, 2019

(65) Prior Publication Data

US 2019/0200106 A1 Jun. 27, 2019

Related U.S. Application Data

(63) Continuation of application No. 15/568,946, filed as application No. PCT/EP2015/077556 on Nov. 24, 2015, now Pat. No. 10,257,597.

(51) Int. Cl.
*H04Q 11/00* (2006.01)
*H04W 40/00* (2009.01)
(Continued)

(52) U.S. Cl.
CPC ........ *H04Q 11/0066* (2013.01); *H04J 3/1611* (2013.01); *H04J 3/1664* (2013.01);
(Continued)

(58) Field of Classification Search
CPC .. H04Q 11/0066; H04J 3/1611; H04J 3/1664; H04L 7/0075
(Continued)

(56) References Cited

U.S. PATENT DOCUMENTS 6,288,811 B1  9/2001 Jiang et al.
8,289,962 B2  10/2012 Fourcand
(Continued)

FOREIGN PATENT DOCUMENTS

WO   2005048625 A1   5/2005
WO   2013189553 A1   12/2013
(Continued)

OTHER PUBLICATIONS

PCT International Search Report, dated Jun. 23, 2016, in connection with International Application No. PCT/EP2015/077556, all pages.
(Continued)

*Primary Examiner* — Oommen Jacob
(74) *Attorney, Agent, or Firm* — Leffler Intellectual Property Law, PLLC

(57) ABSTRACT

A method for switching data signals transmitted over a transport network is disclosed. The method comprises receiving a plurality of input data signals of a first signal type wherein the plurality of data signals of the first signal type comprises data signals exchanged between a Radio Equipment and a Radio Equipment Controller and aggregating the plurality of input data signals into an aggregated first data signal. The method also comprises receiving a second data signal of a second signal type different to the first signal type, and multiplexing the first data signal with the second data signal to form a combined data signal. The method further comprises forwarding the combined data signal to the transport network. Multiplexing the first data signal with the second data signal comprises, for a frame of
(Continued)

the combined data signal, allocating the first data signal to a portion of the frame reserved for the first data signal, and allocating the second data signal to a remaining portion of the frame.

21 Claims, 7 Drawing Sheets

(51) Int. Cl.
  H04J 3/16 (2006.01)
  H04W 88/08 (2009.01)
  H04L 7/00 (2006.01)

(52) U.S. Cl.
  CPC ........... *H04W 40/00* (2013.01); *H04L 7/0075* (2013.01); *H04Q 2011/0086* (2013.01); *H04W 88/085* (2013.01)

(58) Field of Classification Search
  USPC .............................................. 398/53, 48, 45
  See application file for complete search history.

(56) References Cited

U.S. PATENT DOCUMENTS

| | | |
|---|---|---|
| 8,649,388 B2 | 2/2014 | Evans et al. |
| 8,989,088 B2 | 3/2015 | Ling |
| 9,215,296 B1 | 12/2015 | Akhter et al. |
| 9,313,300 B2 | 4/2016 | Akhter et al. |
| 2002/0075854 A1 | 6/2002 | Kumar et al. |
| 2002/0075906 A1 | 6/2002 | Cole et al. |
| 2003/0112833 A1 | 6/2003 | Kamiya |
| 2005/0105552 A1 | 5/2005 | Osterling |
| 2005/0141567 A1 | 6/2005 | Jaber et al. |
| 2007/0116046 A1 | 5/2007 | Liu et al. |
| 2008/0045254 A1 | 2/2008 | Gupta et al. |
| 2008/0145056 A1 | 6/2008 | Boldi et al. |
| 2009/0262699 A1* | 10/2009 | Wengerter ............ H04L 1/0072 370/330 |
| 2010/0246487 A1* | 9/2010 | Aoyama ................ H04W 56/00 370/328 |
| 2011/0032910 A1 | 2/2011 | Aarflot et al. |
| 2011/0117948 A1 | 5/2011 | Ishii et al. |
| 2011/0135013 A1 | 6/2011 | Wegener |
| 2012/0057572 A1* | 3/2012 | Evans ................. H04W 88/085 370/338 |
| 2012/0163819 A1 | 6/2012 | Mun et al. |
| 2013/0089336 A1 | 4/2013 | Dahlfort et al. |
| 2013/0163524 A1 | 6/2013 | Shatzkamer et al. |
| 2014/0031049 A1 | 1/2014 | Sundaresan et al. |
| 2014/0355991 A1 | 12/2014 | Cameirao et al. |
| 2015/0350931 A1 | 12/2015 | Dillinger et al. |
| 2016/0182218 A1 | 6/2016 | Lorenz et al. |
| 2016/0205589 A1 | 7/2016 | Lorenz et al. |
| 2016/0308641 A1 | 10/2016 | Zeng et al. |
| 2016/0373208 A1 | 12/2016 | Liu et al. |
| 2017/0163342 A1* | 6/2017 | Testa ................. H04B 10/25753 |
| 2018/0124482 A1* | 5/2018 | Bottari ............... H04Q 11/0066 |
| 2018/0146509 A1 | 5/2018 | Ruffini et al. |

FOREIGN PATENT DOCUMENTS

| | | |
|---|---|---|
| WO | 2015113643 A1 | 8/2015 |
| WO | 2016138950 A1 | 9/2016 |
| WO | 2016155828 A1 | 10/2016 |
| WO | 2017137098 A1 | 8/2017 |

OTHER PUBLICATIONS

PCT Written Opinion, dated Jun. 23, 2016, in connection with International Application No. PCT/EP2015/077556, all pages.

Antonio De La Oliva et al., Xhaul: Toward and Integrated Fronthaul/Backhaul Architecture in 5G Networks, IEEE Wireless Communications Piscataway, NJ, US, vol. 22, No. 5, Oct. 1, 2015, pp. 32-40.

Volker Jungnickel et al., Software-Defined Open Architecture for Front- and Backhaul in 5G Mobile Networks, 2014 16th International Conference on Transparent Optical Networks (ICTON), Jul. 6, 2014, pp. 1-4.

Bernd Haberland et al., Radio Base Stations in the Cloud, Bell Labs Technical Journal, vol. 18, No. 1, Jun. 30, 2013, pp. 129-152.

* cited by examiner

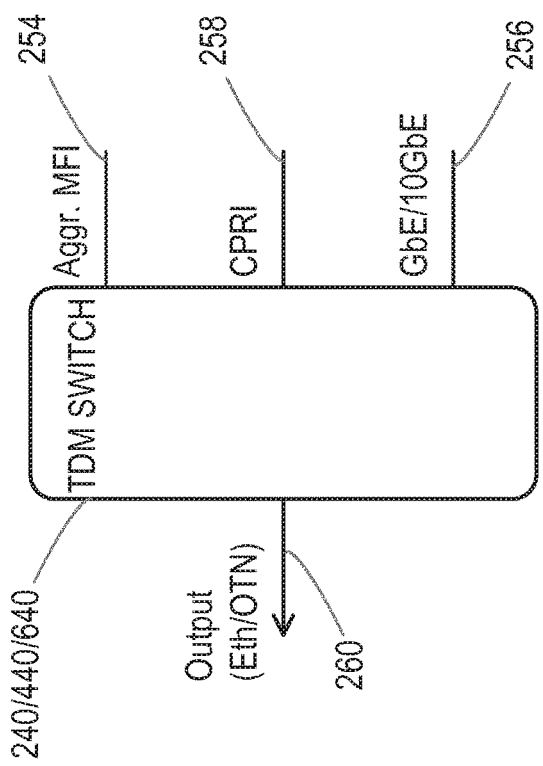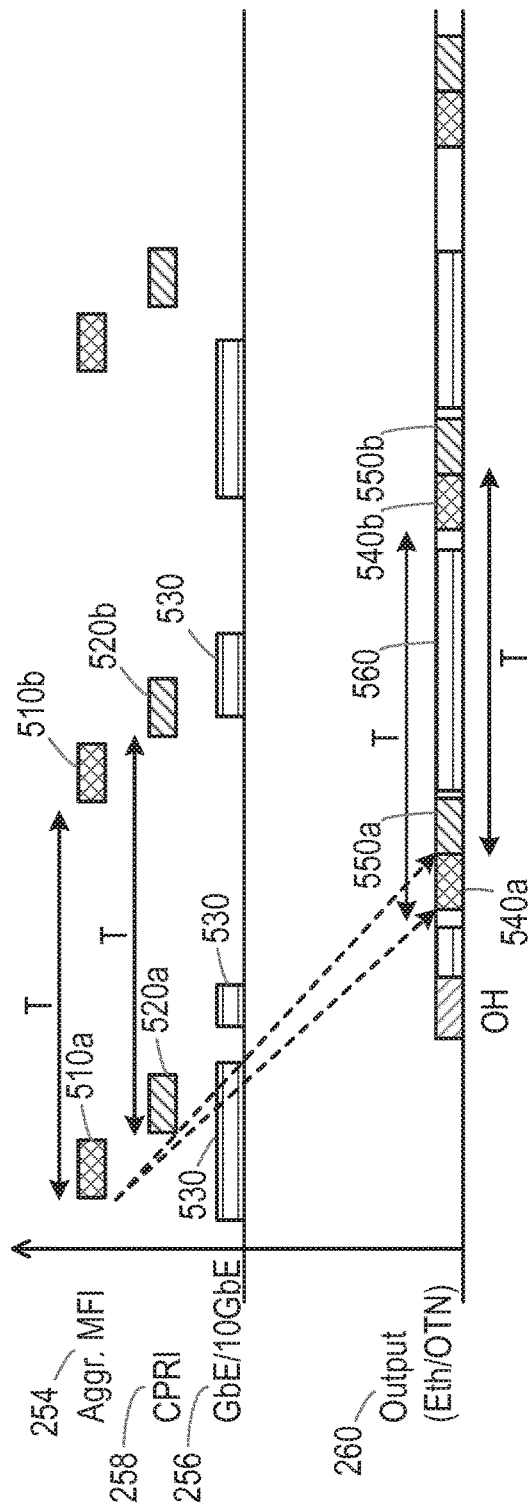

SWITCHING DATA SIGNALS OF AT LEAST TWO TYPES FOR TRANSMISSION OVER A TRANSPORT NETWORK PROVIDING BOTH BACKHAUL AND FRONTHAUL (XHAUL) CONNECTIVITY

CROSS-REFERENCE TO RELATED APPLICATIONS

This application claims the benefit of U.S. application Ser. No. 15/568,946 filed Oct. 24, 2017 (371(c) date), which is a 35 U.S.C. § 371 national stage of international application PCT/EP2015/077556 filed Nov. 24, 2015. All of these earlier applications are hereby incorporated herein by reference in their entireties.

TECHNICAL FIELD

The present disclosure relates to a method for switching data signals for transmission over a transport network. The present disclosure also relates to an apparatus for switching data signals for transmission over a transport network, and to a system for exchanging data signals.

BACKGROUND

In cellular communication networks, radio base stations (RBS) provide radio network coverage over a coverage area or cell. Communication links between the RBSs of a network and the communication network core segment are referred to as the Mobile Backhaul (MBH) or backhaul. In traditional architectures, both radio and baseband processing are performed in the RBS, which outputs an Ethernet signal which is then transported over the MBH using microwave and/or optical fibre. In some implementations, RBSs may be separated into one or more radio units and one or more baseband processing units, enabling, among other advantages, the optimising of radio unit placement. The radio units may be referred to as Remote Radio Units (RRUs) or as Radio Equipments (REs). The baseband processing units may be referred to as Digital Units (DUs) or as Radio Equipment Controllers (RECs). The communication links between REs and RECs in such deployments are collectively referred to as the Mobile Fronthaul (MFH) or fronthaul, and the interface between REs and RECs is referred to in the following specification as the Fronthaul Interface (FHI). The Common Public Radio Interface (CPRI) specifies an interface protocol for the FHI, managing RBS communication between REs and RECs.

The Xhaul paradigm proposes the combination of MFH and MBH in a common connectivity segment, with the aim of implementing the technological shift that will be required of 5G communication networks. Xhaul proposes the concurrent transport of CPRI traffic from REs towards a centralised REC pool and Ethernet traffic from conventional RBSs towards further aggregations stages.

5G networks will be required to accommodate exponential increases in bandwidth usage compared to current levels. Owing to the bandwidth intensive nature of CPRI, this increase in bandwidth is likely to render the use of CPRI impractical for fronthaul communications: CPRI bandwidth can be up to 30 times higher than equivalent radio signal bandwidth, meaning for a 10 Gbps radio signal, CPRI could attain 300 Gbps, which cannot be managed.

SUMMARY

According to a first aspect of the present disclosure, there is provided a method for switching data signals transmitted over a transport network; the method comprising receiving a plurality of input data signals of a first signal type wherein the plurality of data signals of the first signal type comprises data signals exchanged between a Radio Equipment (RE) and a Radio Equipment Controller (REC). The method further comprises aggregating the plurality of input data signals into an aggregated first data signal, receiving a second data signal of a second signal type different to the first signal type and multiplexing the first data signal with the second data signal to form a combined data signal. The method further comprises forwarding the combined data signal to the transport network. Multiplexing the first data signal with the second data signal comprises, for a frame of the combined data signal, allocating the first data signal to a portion of the frame reserved for the first data signal, and allocating the second data signal to a remaining portion of the frame.

Thus, different signal types including data signals between a RE and REC, are efficiently transported.

According to examples of the disclosure, the aggregated first data signal and the combined data signal may be synchronised with a reference timing signal, and/or multiplexing the aggregated first data signal with the second data signal to form a combined data signal may comprise performing time division multiplexing of the aggregated first data signal with the second data signal.

According to examples of the disclosure, the second input data signal may comprise a data signal exchanged between a Radio Base Station (RBS) and a core network.

According to another aspect of the present disclosure, there is provided apparatus for switching data signals transmitted over a transport network; the apparatus comprising a plurality of ports configured to receive a plurality of input data signals of a first signal type which are exchanged between a RE and an REC, and a first switch configured to aggregate the plurality of input data signals into an aggregated first data signal. The apparatus further comprises a port configured to receive a second data signal of a second signal type different to the first signal type, a multiplexing switch configured to multiplex the first data signal with the second data signal to form a combined data signal, and an interface configured to forward the formatted combined data signal to the transport network. The multiplexing switch comprises a framer configured, for a frame of the combined data signal, to multiplex the first and second data signals by allocating the first data signal to a portion of the frame reserved for the first data signal, and allocating the second data signal to a remaining portion of the frame.

According to another aspect of the present disclosure, there is provided apparatus for switching data signals transmitted over a transport network; the apparatus comprising a processor and a memory, the memory containing instructions executable by the processor whereby the apparatus is operative to receive a plurality of input data signals of a first signal type wherein the plurality of data signals of the first signal type comprises data signals exchanged between a Radio Equipment (RE) and a Radio Equipment Controller (REC) and aggregate the plurality of input data signals into an aggregated first data signal. The apparatus is further operable to receive a second data signal of a second signal type different to the first signal type, multiplex the first data signal with the second data signal to form a combined data signal, and forward the combined data signal to the transport network. Multiplexing the first data signal with the second data signal comprises, for a frame of the combined data signal, allocating the first data signal to a portion of the frame reserved for the first data signal, and allocating the second data signal to a remaining portion of the frame.

According to another aspect of the present disclosure, there is provided a system for exchanging data signals, the system comprising a first apparatus according to the second or third aspects of the present disclosure, the first apparatus configured as a hub node and operable to receive input data signals from an REC and a router, a second apparatus according to the second or third aspects of the present disclosure, the second apparatus configured as a remote node and operable to receive input data signals from an RE and an RBS, and a transport network coupled between the first apparatus and the second apparatus. The first apparatus is configured to transmit data signals of the first and second type over the transport network to the second apparatus, and the second apparatus is configured to transmit data signals of the first and second type over the transport network to the first apparatus.

According to another aspect of the present disclosure, there is provided a computer program comprising instructions which, when executed on at least one processor, cause the at least one processor to carry out a method according to the first aspect of the present disclosure.

According to another aspect of the present disclosure, there is provided a carrier containing a computer program according to a preceding aspect of the present disclosure, the carrier comprising an electronic signal, an optical signal, a radio signal or a computer readable storage medium.

BRIEF DESCRIPTION OF THE DRAWINGS

For a better understanding of the present disclosure, and to show more clearly how it may be carried into effect, reference will now be made, by way of example, to the following drawings in which:

FIGS. 6a and 6b illustrate operation of a multiplexing switch in the hub node of FIG. 4 or remote node of FIG. 5.

DETAILED DESCRIPTION

Figure 1:
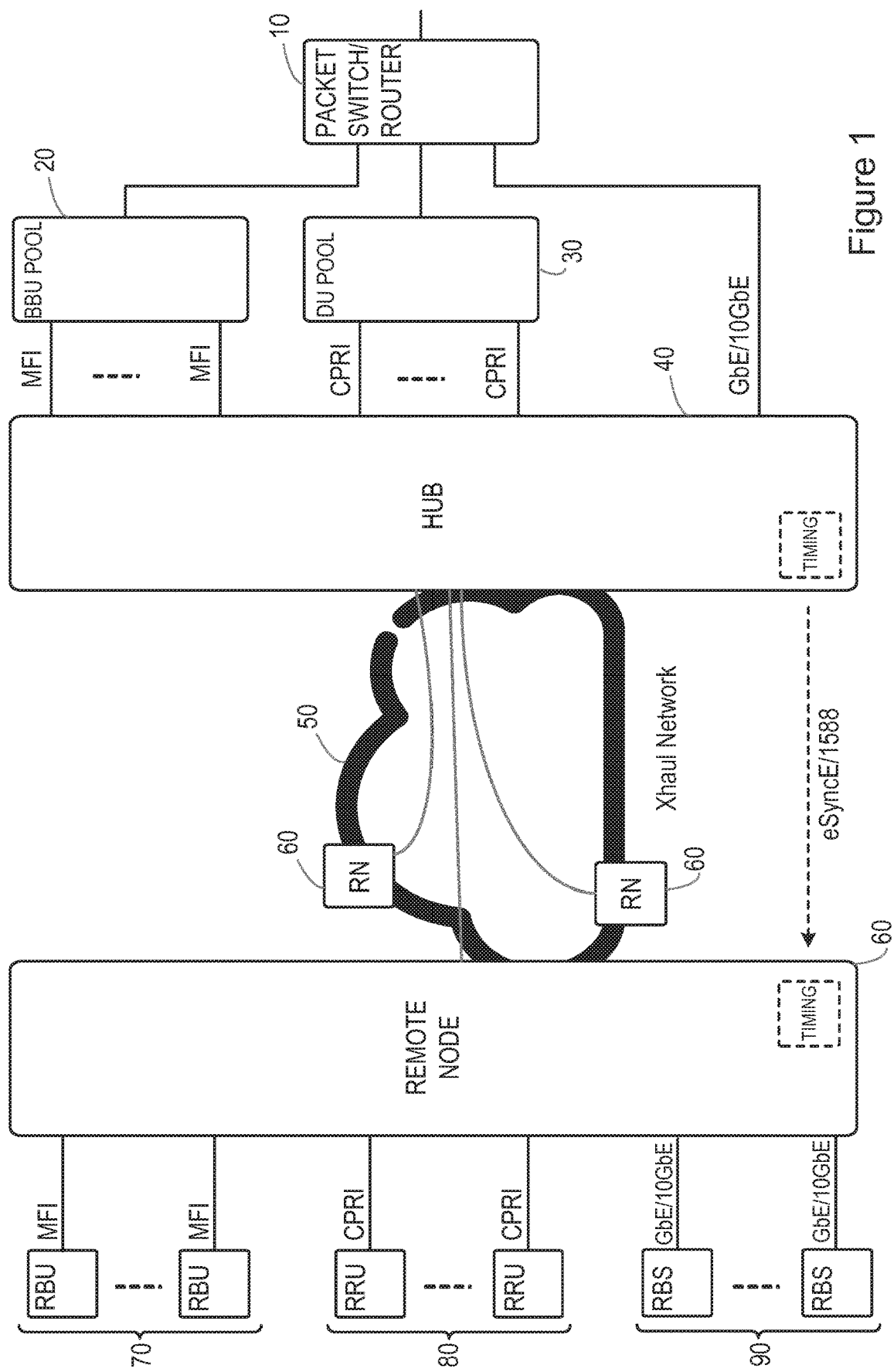
FIG. 1 is a block diagram illustrating elements in a system for exchanging data signals.

In order to address the conflict between the bandwidth intensive nature of CPRI and the bandwidth requirements for 5G, a new division of radio protocols may be used for REs and RECs, moving physical layer (L1) processing "back" to the RE. An RE operable to perform L1 processing is referred to the rest of the present disclosure as a modified RE, or Radio Baseband Unit (RBU), and an REC cooperating with such a modified RE is referred to as a modified REC or Baseband Unit (BBU). The interface between a modified RE and modified REC is referred to in the present disclosure as the Modified Fronthaul Interface (MFI). The MFI between RBU (i.e. RRU) and BBU is a packet interface. The packet based MFI protocol is for fronthaul, e.g. configured to carry radio data corresponding to radio frequency data for transmission. The MFI packets carry radio data allowing generation of the radio frequency signal for transmission at the RBU (i.e. RRU), and received radio data requiring baseband processing in a BBU. The MFI packets are not encapsulated to be in the form of packets; MFI is a packet interface. Switching solutions for an Xhaul connectivity segment may therefore be required to deal both with legacy CPRI signal flows (not packet based) and with packet based protocols from e.g. backhaul (e.g. Ethernet) and the new packet based fronthaul interface (e.g. the protocol referred to as MFI).

Packet switches offer the advantage of managing both Ethernet and the new packet based Fronthaul protocols in the same switching engine. However, Packet Delay Variation (PDV) and delay control are difficult to manage when both these signals are processed by the same switch. The IEEE 802.1 Time-Sensitive Networking Task Group (TSN TG) is studying this problem, but there are issues with latency (in the case of multiple switching hops), with deterministic delay to be ensured downstream and upstream, with PDV, and with synchronization distribution.

Circuit switches deal with jitter and delay control better than packet switches, but cannot offer statistical multiplexing gain, which is useful to handle traffic loads of the orders expected in 5G. 5G traffic is expected to be characterized by a highly bursty distribution, with peaks as high as 10 Gbps per sector and average traffic as low as 200 kbps. Without statistical multiplexing, a network serving 100 sectors might require 1 Tbps. Introducing statistical multiplexing allows dimensioning of the network to accommodate one peak, i.e. 10 Gbps, and 100 times the average traffic, i.e. 20 Mbps.

Aspects of the present disclosure provide a layered switching architecture and method according to which input data signals of different signal types may be forwarded for transport over a transport network. Examples of the layered switching architecture and method may enable exploitation of statistical multiplexing gain while also ensuring deterministic delay and low PDV in the implementation of combined Fronthaul and Backhaul communications. The architecture and method may involve packet, Time Division Multiplexing and transport network elements. An implementation of the architecture may involve a first switching apparatus, acting as a hub node, and a second switching apparatus, acting as a remote node. Each of the hub and remote nodes may comprise first, second and third stages as discussed below.

Considering a hub node, the node may comprise a first stage including one or more independent switches, each switch handling one homogenous type of signal. For example, a first independent switch may handle MFI signals, a second independent switch may handle legacy radio signals such as CPRI signals and a third independent switch may handle Ethernet signals. Different MFI or CPRI implementations, for example as may be provided by different vendors, may be managed by dedicated switches. The output of each switch may be made time synchronous by providing an external timing reference. In some examples, the circuit switched fronthaul data signal is converted to a packet switched format. In some examples, the CPRI switch may include an InterWorking Function (IWF) so that the output frame has an Ethernet format.

A second stage of the hub node may comprise a Time Division Multiplexing (TDM) switch, which receives as input the output of the switches of the first stage and assigns these first stage outputs time slots in a frame. The second stage TDM switch may receive the same or common external timing reference as the first stage switches, enabling synchronous operation.

A third stage of the hub node may comprise an interface for formatting the output of the TDM switch for transport over the relevant transport network. In the case of an optical transport network, this formatting may include assigning reconfigurable wavelengths to the TDM frames output by the TDM switch. Other formatting examples may be envisaged for different transport network types.

A switching apparatus acting as a remote node may include complementary first, second and/or third stages to those described above in the context of a hub node. The hub node and remote node may thus act to render packet traffic synchronous with the use of an external timing reference, so enabling the control of delay and the minimization of PDV. The hub node communicates with one or more remote nodes over a transport network, e.g. an optical network. The transport network is a fronthaul network between one or more RE and one or more REC, and also provides for communication (i.e. backhaul) between a RBS having integrated baseband processing and a core network. Packet traffic may be encapsulated in standard Ethernet and standard transport network formatting to ensure full interworking with current networks.

FIG. 1 illustrates an example system comprising a hub node 40 and a plurality of remote nodes 60 as described above. The connectivity of one of the remote nodes 60 is shown in greater detail for the purposes of illustration. In the example system of FIG. 1, the transport network 50 via which the hub and remote nodes 40, 60 communicate implements Xhaul connectivity between, on one side, one or more baseband processing unit (e.g. BBUs processing packet MFI signals, one or more DUs processing non-packet radio signals such as CPRI), and a packet switch/router 10 for backhaul traffic, and on another side, a plurality of RBUs, RRUs and/or RBSs (i.e. REs and/or RBSs).

The hub node 40 and remote nodes 60 are coupled by a transport network 50 providing both backhaul and fronthaul (i.e. Xhaul) connectivity. In some examples, the transport network 50 is an optical network. For example, the optical network between the REs and RECs comprises optical links, e.g. optical fibers, and the signals are carried in an optical format. Some examples employ OTN technology or may employ other technology such as Synchronous Digital Hierarchy (SDH), Wavelength Division Multiplexing (WDM), TDM, Ethernet etc.

The hub node 40 is connected to one or more baseband processing units, e.g. BBUs, which may be comprised within a BBU pool 20, from which it receives a plurality of first data signals in the form of MFI data signals. The hub 40 is optionally also connected to one or more further baseband processing units, e.g. DUs, which may be comprised within a DU pool 30, from which it receives a plurality of third data signals in the form of digitized radio signals, for example CPRI signals. The hub 40 is also connected to a packet router 10, from which it receives a second data signal in the form of backhaul packet signal, which may for example comprise Ethernet traffic.

The hub 40 comprises a timing controller which exchanges reference timing information with timing controllers in each remote node 60, for example, generated or received using Synchronous Ethernet or IEEE1588 protocols.

Each remote node 60 is connected to one or more RBUs 70, from which the remote node 60 communicates MFI signals. The remote nodes 60 are also connected to one or more RRUs 80, from which the remote nodes 60 receive a plurality of non-packet radio signals, for example CPRI signals. The remote nodes 60 may further be connected to one or more RBSs 90, from which the remote nodes receive backhaul traffic, which may for example be Ethernet traffic. In some examples, the system may handle any combination of one or more of the first, second and/or third data signals.

Figure 2:
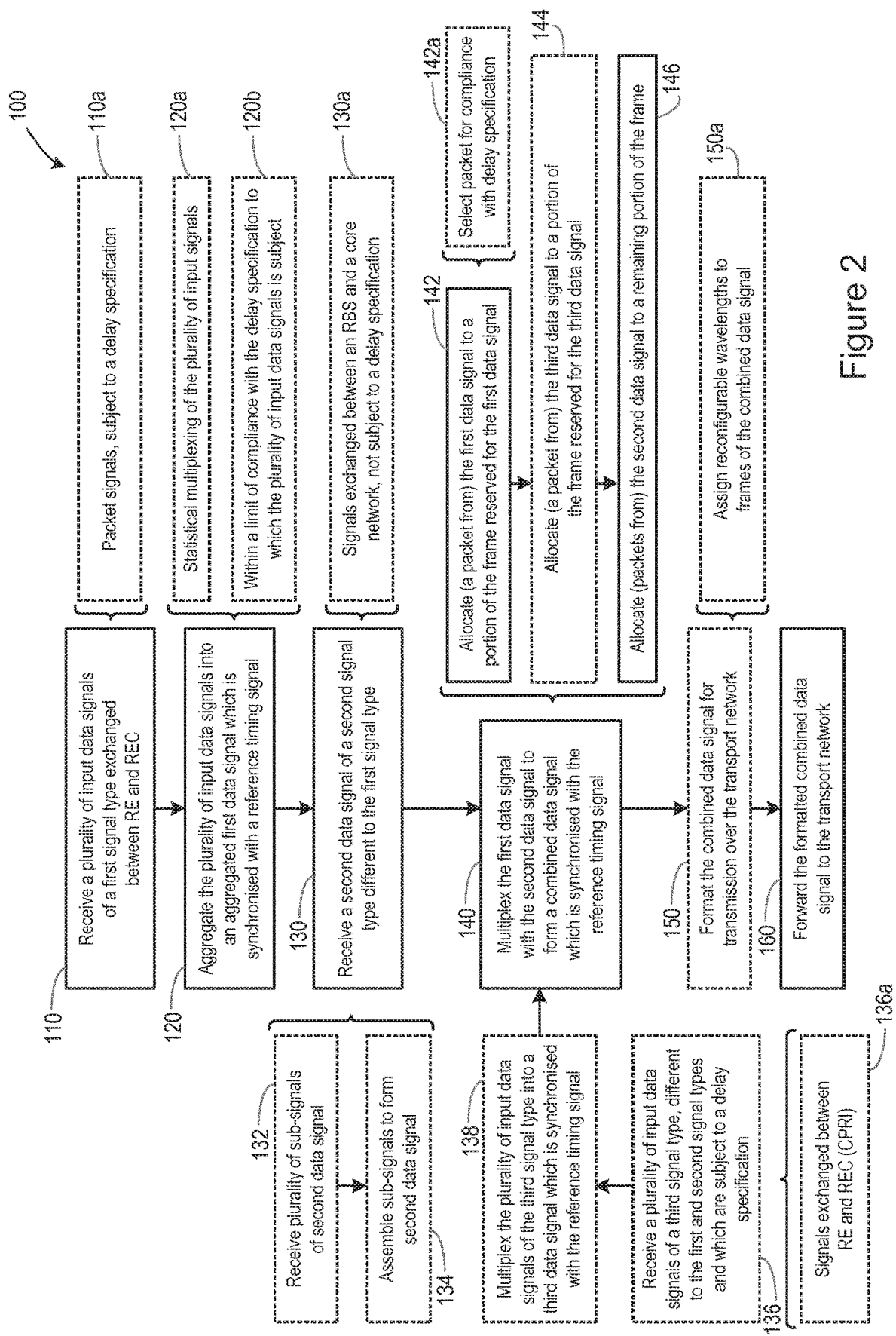
FIG. 2 is a flow chart illustrating process steps in a method for switching data signals transmitted over a transport network.

FIG. 2 illustrates an example method 100 for switching data signals transmitted over a transport network. The steps of method 100 may be conducted in a switching apparatus, which may be acting as a hub node 40 or as a remote node 60, as illustrated in the example system of FIG. 1 and as explained in further detail below with reference to FIGS. 3 to 7.

Referring to FIG. 2, in a first step 110, the method comprises receiving a plurality of input data signals of a first signal type. The plurality of data signals of the first signal type comprise data signals exchanged between a Radio Equipment (RE) and a Radio Equipment Controller (REC), and each data signal may be exchanged between a dedicated RE and REC, which REC may be comprised within an REC pool comprising a plurality of RECs. In some examples, the data signals may comprise packet data signals. Layer 1 processing of the packet data signals may be performed at the RE. The RE and REC may thus be a modified RE or RBU and modified REC or BBU, with both radio and L1 processing being performed at the RE. The first data signals may be referred to as MFI signals. The first signal type (e.g. MFI) may be radio data, providing signals for transmission or receiving at radio frequencies by an antenna. For example, the radio data may be I/Q data. The radio data may be digitized or analog. The first signal type may comprise data carried in packets between the modified RE and modified REC (also termed RBU and BBU). The radio data is processed by the REC to convert to/from a baseband signal. The packet fronthaul data protocol referred to as MFI may be generated and/or received at the RE and/or REC in a packet format. The MFI format of radio data may provide a same or similar function to CPRI, except being a packet format.

The plurality of input data signals of the first signal type may be subject to a delay specification as illustrated in step 110a, which may comprise one or more delay or latency requirements, each delay or latency requirement applying to a specific one of the plurality of input data signals. In the case of MFI signals between a modified RE and REC, the signals may be subject to stringent latency requirements to ensure adequate service performance. In some examples, the method may further comprise receiving the delay specification from the REC or from the pool of RECs.

Following receipt of the first plurality of data signals, the method 100 then comprises, at step 120, aggregating the plurality of input data signals into an aggregated first data signal. This aggregation step may be performed in one or more dedicated switches and constitutes a part of the first stage described above. In this first stage, signals of different types are independently handled by different switches. For example, a first stage switch handles aggregation/switching of MFI signals, and a separate first stage switch handles aggregation/switching of non-packet fronthaul signals (e.g. CPRI) and/or a separate third stage switch handles aggregation/switching of packets backhaul signals.

In some examples, the first stage aggregation may combine data from different ones of the plurality of input data signals of the same type. The aggregated signals may be aggregated into the same frame of the aggregated first data signal, or the aggregation may be spread over a plurality of different frames of the aggregated first data signal. This may be the case for each type of data signals.

The aggregated first data signal may in some examples be synchronised with a reference timing signal, which may be generated or received as part of the method 100, for example the method 100 may further comprise receiving or generating the reference timing signal via a SyncE or using IEEE1588 protocol or in some other appropriate manner.

Step 120 may be performed in a dedicated packet switch, and may involve the step 120a of performing statistical multiplexing of the plurality of input data signals. Statistical multiplexing may comprise determining a total bandwidth of the input data signals which may be shared between the plurality of input data signals according to the demand of each data signal. Thus, each data signal is not allocated a static bandwidth allocation, but shares a common allocation. The total bandwidth may be based on the predicted instantaneous traffic demands of the plurality of input data signals. Based on the assumption that not all of the input data signals is using maximum traffic, the allocated total bandwidth may be lower than that indicated by summing individual data signal requirements. In some examples, statistical multiplexing may be considered as dividing the aggregated first data signal into an arbitrary number of variable bit-rate digital channels or data streams corresponding to the plurality of input data signals, and adapting allocation of bit-rate to the different channels according to the instantaneous traffic demands of the plurality of input data signals.

The statistical multiplexing may be performed within a limit of compliance with the delay specification to which the plurality of input data signals is subject, as shown in step 120b. For example, the statistical multiplexing is carried out according to the delay and/or latency requirements.

In step 130, the method 100 comprises receiving a second data signal of a second signal type different to the first signal type and which is not subject to the delay specification which may apply to the plurality of input signals of the first signal type. In some examples, the second input data signal may comprise a packet (e.g. Ethernet) data signal exchanged between a Radio Base Station (RBS) and a core network, as shown in step 130a. In some examples, a plurality of sub-signals of the second data signal may be received in step 132, for example from multiple RBSs, and the method 100 may further comprise assembling the sub-signals to form the second input data signal in step 134. As previously, the sub-signals may be assembled by combining different sub-signals in a single frame of the second input data signal or by spreading different sub-signals over different frames of the second input data signal. Each sub-signal may be exchanged between a different RBS and the core network. The step of assembling the sub-signals to form the second input data signal may be performed in one or more dedicated switches and also constitutes a part of the first stage described above, in which signals of different types are independently handled. The second signal type is carrying backhaul for communication with the core network. Thus, the second signal type is not subject to the same delay/latency requirements of the first signal type, which is carrying packet radio data for fronthaul.

In some examples, the method 100 may further comprise the step 136 of receiving a plurality of input data signals of a third signal type, different to the first and second signal types and which may also be subject to a delay specification. As shown in step 136a, the plurality of input data signals of the third signal type may for example be radio signals such as CPRI signals exchanged between an RE and an REC, which may be comprised within an REC pool comprising a plurality of RECs. The method 100 may further comprise the step 138 of multiplexing the plurality of input data signals of the third signal type into a third data signal which is synchronised with the reference timing signal. In some examples the multiplexing may combine data from different ones of the plurality of input data signals of the third signal type into the same frame of the third data signal, or the multiplexing may be spread over several different frames of the third data signal.

Step 138 may also comprise converting the third data signal to a packet format such as an Ethernet format, for example through the application of an IWF. The step of multiplexing the plurality of input data signals of the third signal type into a third data signal may be performed in one or more dedicated switches and also constitutes a part of the first stage described above, in which signals of different types are independently handled.

In step 140, the method 100 comprises multiplexing the first data signal with the second data signal, and the third data signal if received, to form a combined data signal. In some examples, the multiplexing is synchronised with the reference timing signal. The multiplexing step 140 may be performed in a further multiplexing switch, and constitutes the second stage described above, in which a multiplexing switch receives as input the output of the switches of the first stage and assigns these first stage outputs to portions of a frame. The multiplexing step 140 comprises, in step 142, allocating a portion, for example a packet, from the first data signal to a portion of a frame of the combined data signal reserved for the first data signal. The portion or packet of the first data signal selected for allocation may be selected to ensure compliance with the delay specification to which the first plurality of input data signals may be subject, as shown in step 142a.

The multiplexing step 140 may then comprise, if the third data signal has been received, allocating a portion such as a packet from the third data signal to a portion of the frame reserved for the third data signal in step 144. Again, a portion or packet may be selected to ensure compliance with the delay specification to which the third data signal is subject. The multiplexing step 140 then comprises allocating a portion such as one or more packets from the second data signal to a remaining portion of the frame in step 146. As noted above, the second data signal may not be subject to the same stringent delay requirements as the first and third data signal types, and thus may be used to fill any remaining resource available in the frame once the first (and optionally third) data signals have been allocated.

In some examples of the invention, the multiplexing step 140 may be performed as a time division multiplexing in a TDM switch. The reserved and remaining portions of the combined data signal frame may be time slots. Thus, the first, second and/or third data signals may be arranged in a transport frame according to time slots, i.e. may be time division multiplexed. The TDM switch may provide for transport over a circuit switched channel (e.g. an optical channel). The radio data carried by the first (and optionally third) data signals have reserved time allocations within the frame. Thus, the packets of different types of data (e.g. radio data, backhaul data) of the first and third data signals are carried as time multiplexed signals within the same frame. In some examples, the time slots may be allocated at multiples of the reference timing signal used in earlier aggregating steps, as described in further detail below with reference to FIGS. 6a and 6b. The multiplexing 140 generates a frame which comprises signals of more than one type, e.g. one or more of the first, second and/or third type. The signals of the first, second and/or third type have themselves been separately aggregated in a first stage from a plurality of sources of a particular type, e.g. a plurality of first type signals (e.g. MFI).

Once the combined data signal has been formed, the method 100 may comprise, in step 150, formatting the combined data signal for transmission over the transport network, and, in step 160, forwarding the formatted combined data signal to the transport network. In some examples, the transport network may be an optical network, e.g. using OTN for transport. The formatting step 150 may comprise assigning reconfigurable wavelengths to frames of the combined data signal in step 150a. In other examples, alternative transport network technologies may be envisaged, including Synchronous Digital Hierarchy (SDH), TDM, Ethernet etc. In some examples, the transport network may use any synchronous transport protocol, including OTN or Synchronous Ethernet (SyncE) as described above. In such cases appropriate formatting steps may be performed at step 150 to enable transport of the combined data signal over the transport network. The formatting step 150 constitutes the third stage described above, in which a combined data signal is formatted for transport over the relevant transport network. The steps of the first, second and third stages described above thus allow a corresponding switch to receive and distribute the data to its intended destination.

It will be appreciated that the above described method steps illustrate a switching method in which multiple different signal types are combined for transporting over a transport network. The method 100 may further comprise steps facilitating receipt of a combined data signal, extraction of the component data signals and switching of the component data signals to their intended recipients. For example, the method 100 may further comprise receiving a combined data signal from the transport network, formatting the received signal for processing and demultiplexing in a second stage the formatted received signal into a first data signal and a second data signal, and in some examples a third data signal. The demultiplexed signals are transmitted to different switches according to their type, i.e. first signal type packets are switched to a dedicated first signal type switch, second signal type packets to the packet switch/router 10, and third signal type data to the third signal type switch.

The method may also comprise disaggregating in a first stage the first data signal into a plurality of first data signals, demultiplexing the third data signal into a plurality of third data signals, and outputting the plurality of first data signals, the plurality of third data signals, and the second data signal. This disaggregating or demultiplexing occurs in separate switches according to the different protocols carried in the same frame. The process of demultiplexing the formatted received signal may comprise, for a frame of the formatted received signal, extracting a packet to the first data signal from a portion of the frame reserved for the first data signal, extracting a packet to the third data signal from a portion of the frame reserved for the third data signal, and extracting packets to the second data signal from a remaining portion of the frame. From the extracted data signals of a particular type, e.g. first data signal, the first stage splits the signal into the separate destinations for each of the component first data signals. Thus, a plurality of nodes (e.g. RBU, BBU) may communicate at the same time using the described system, with the plurality of flows of the same type separated/combined in a dedicated switch as a separate step to separating/combining with a different data type.

Figure 3:
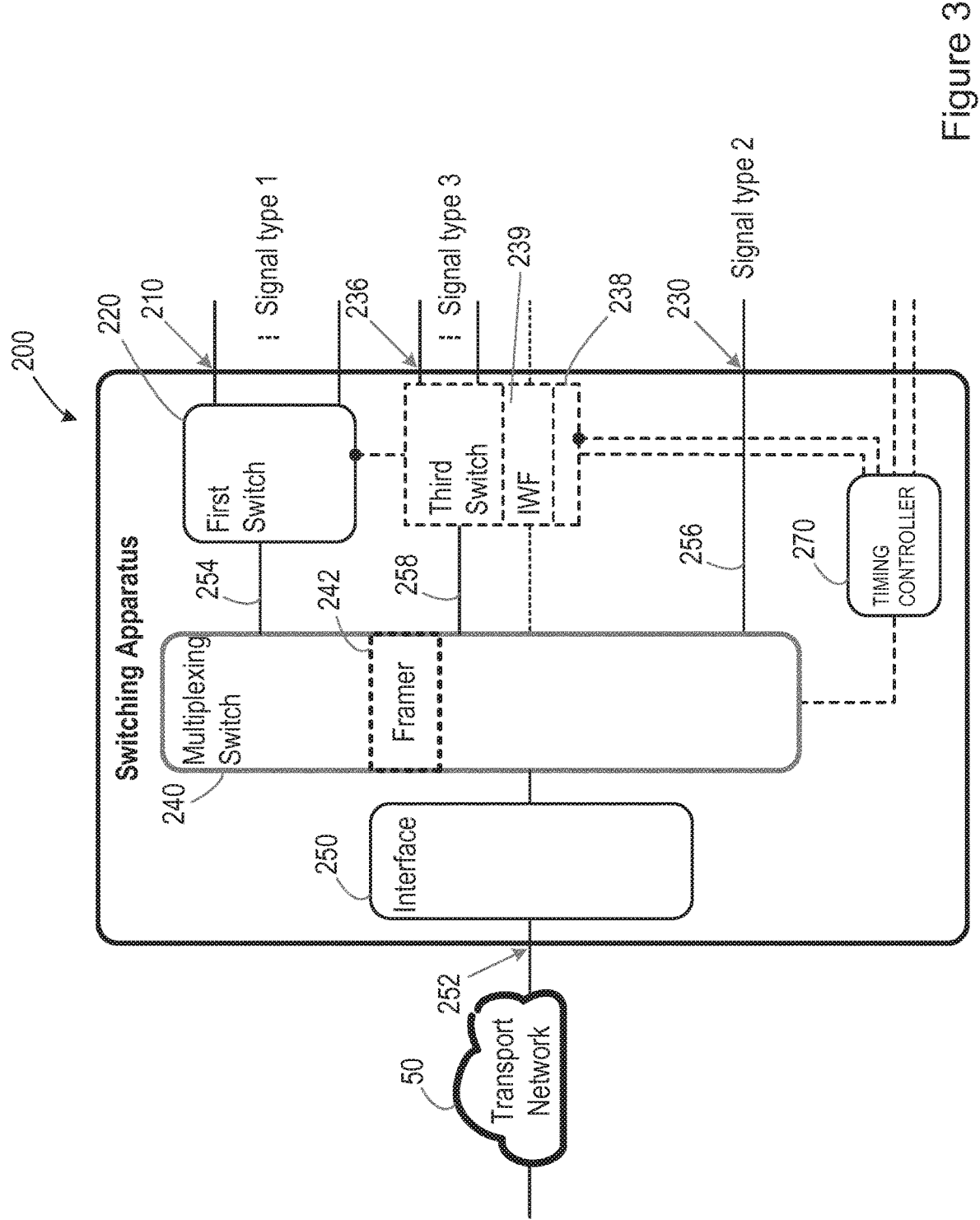
FIG. 3 is a block diagram illustrating functional units in a switching apparatus.

FIG. 3 illustrates a switching apparatus 200, which may conduct the steps of the method 100, for example on receipt of suitable instructions from a computer program. It will be appreciated that the units illustrated in FIG. 3 may be realised in any appropriate combination of hardware, firmware and/or software. For example, the units may comprise one or more processors and one or more memories containing instructions executable by the one or more processors. The units may be integrated to any degree. The switching apparatus 200 corresponds to either of the hub node 40 or the remote node 60 discussed above with reference to FIG. 1. The description below provides examples of transmission by a switching apparatus 200 as the hub node; transmission as the remote node and receiving as the hub node or remote node are also briefly described below and may be understood to function in a corresponding manner.

Referring to FIG. 3, the switching apparatus 200 comprises a plurality of ports 210 configured to receive (or output, in the case of reception operation) a plurality of input data signals of a first signal type of radio data. The plurality of input signals of the first signal type may be subject to a delay specification. The plurality of ports may be configured to receive a plurality of input data signals each exchanged between an RE and an REC. As discussed above, the first input data signals may be packet data signals of MFI traffic exchanged between a radio unit (RE, RRU or RBU) and a baseband processing unit (e.g. REC, DU or BBU) over the transport network.

The switching apparatus 200 may also comprise a timing function, in the form of a timing controller 270 which may be configured to provide a timing reference signal. The timing controller may generate or receive the timing reference signal, for example via a SyncE or IEEE1588 protocol or in some other appropriate manner. The timing controller 270 may be further configured to receive the delay specification for the plurality of data signals of the first signal type, for example from a REC or pool of RECs, alternatively, the delay specification for the plurality of data signals of the first signal type may be received by a multiplexing switch 240, as described below.

The switching apparatus 200 comprises a first switch 220, which may be a packet switch, and is configured to aggregate the plurality of input data signals into an aggregated first data signal. The aggregated first data signal may in some examples be synchronised with the reference timing signal. The ports 210 are connected to the first switch 220 to deliver the plurality of first data signals to the first switch 220. The first switch 220 may be configured to perform statistical multiplexing of the plurality of input data signals, and in some examples may perform statistical multiplexing within a limit of compliance with the delay specification to which the plurality of input data signals is subject, and as determined for example using the timing controller 270.

The first switch 220 is thus configured to aggregate a plurality of first data signals (e.g. fronthaul packet radio signals) received on the ports 210, each signal corresponding to a particular RE or a particular REC. Correspondingly, when receiving data traffic over a transport network, the first switch 220 is configured to separate component data signals of the combined data signal of the first signal type, and to switch each component data signal to the appropriate port for baseband processing (or radio transmission).

The switching apparatus 200 also comprises a port 230 configured to receive or output a second data signal of a second signal type different to the first signal type and which is not subject to the delay specification. The second data signal may be a packet (e.g. Ethernet) data signal exchanged between an RBS and a core network (i.e. backhaul). In some examples, the second input data signal comprises a plurality of sub-signals, and the apparatus may further comprise a second switch configured to assemble the sub-signals to form the second input data signal.

The switching apparatus 200 may also comprise a plurality of ports 236 configured to receive or output a plurality of input data signals of a third signal type, different to the first and second signal types. The third signal type may be subject to a delay specification, which may be the same or a different delay specification to that applicable to the first signal type. The input data signals of the third signal type may be CPRI signals exchanged between an RE and an REC or pool of RECs. The switching apparatus 200 may also comprise a third switch 238 configured to multiplex the plurality of input data signals of the third signal type into a third data signal, which in some examples is synchronised with the reference timing signal. The third switch may be a multiplexer and may comprise an IWF 239 configured to convert the third data signal to a packet format, such as an Ethernet format. The third switch 238 is configured to aggregate a plurality of CPRI signals received on the ports 236, each signal corresponding to a particular RE or a particular REC. Correspondingly, when receiving data traffic over the transport network, the third switch 238 is configured to separate component data signals of the combined data signal of the third signal type, and to switch each component data signal to the appropriate port for baseband processing (or radio transmission).

The switching apparatus 200 comprises a multiplexing switch 240 configured to multiplex the first data signal with the second data signal, and optionally the third data signal, if received, to form a combined data signal. The combined data signal may also be synchronised with the reference timing signal. The multiplexing switch 240 comprises a framer 242 configured, for a frame of the combined data signal, to multiplex the first, second and optionally third data signals. The multiplexing may be a time multiplexing. The switch 240 is configured to allocate the first data signal to a portion of the frame reserved for the first data signal. Optionally, the switch 240 is configured to allocate the third data signal to a portion of the frame reserved for the third data signal. In some examples, the switch 240 is configured to allocate the second data signal to a remaining portion of the frame. Thus, the first, second and third data signals are allocated to a predetermined part (time slot) of the frame by the switch 240 in the second stage.

The multiplexing switch 240 may be a TDM switch, and may be configured to select packets from the first and third data signals for allocation to the relevant reserved portions to ensure compliance with the delay specification to which the first and third input signals are subject. In some examples, the multiplexing switch 240 generates frames for transport over a circuit switched channel, e.g. provided by transport network 50. All the clients (first, second, third data signals) are framed in a single container, for example a time division multiplexed container, e.g. an OTN or OTN-like container. In some aspects, the switch 240 may be considered as an OTN/TSN switch.

The multiplexing switch 240 may schedule first, second and/or third data signals according to one or more criteria. The first and/or third data signals may be prioritized over the second data type, e.g. to meet the delay and/or latency requirements. For example, the scheduling of data packets from the first data signal and third data signal may be carried out to ensure compliance with the appropriate delay specification, which may be received directly by the multiplexing switch 240 or via the timing controller 270. The radio data of the first and/or third data signal may be scheduled for alignment with the radio transmission (or reception) over the air interface. In some examples, the timing controller 270 supports the scheduling of the radio traffic.

Figure 4:
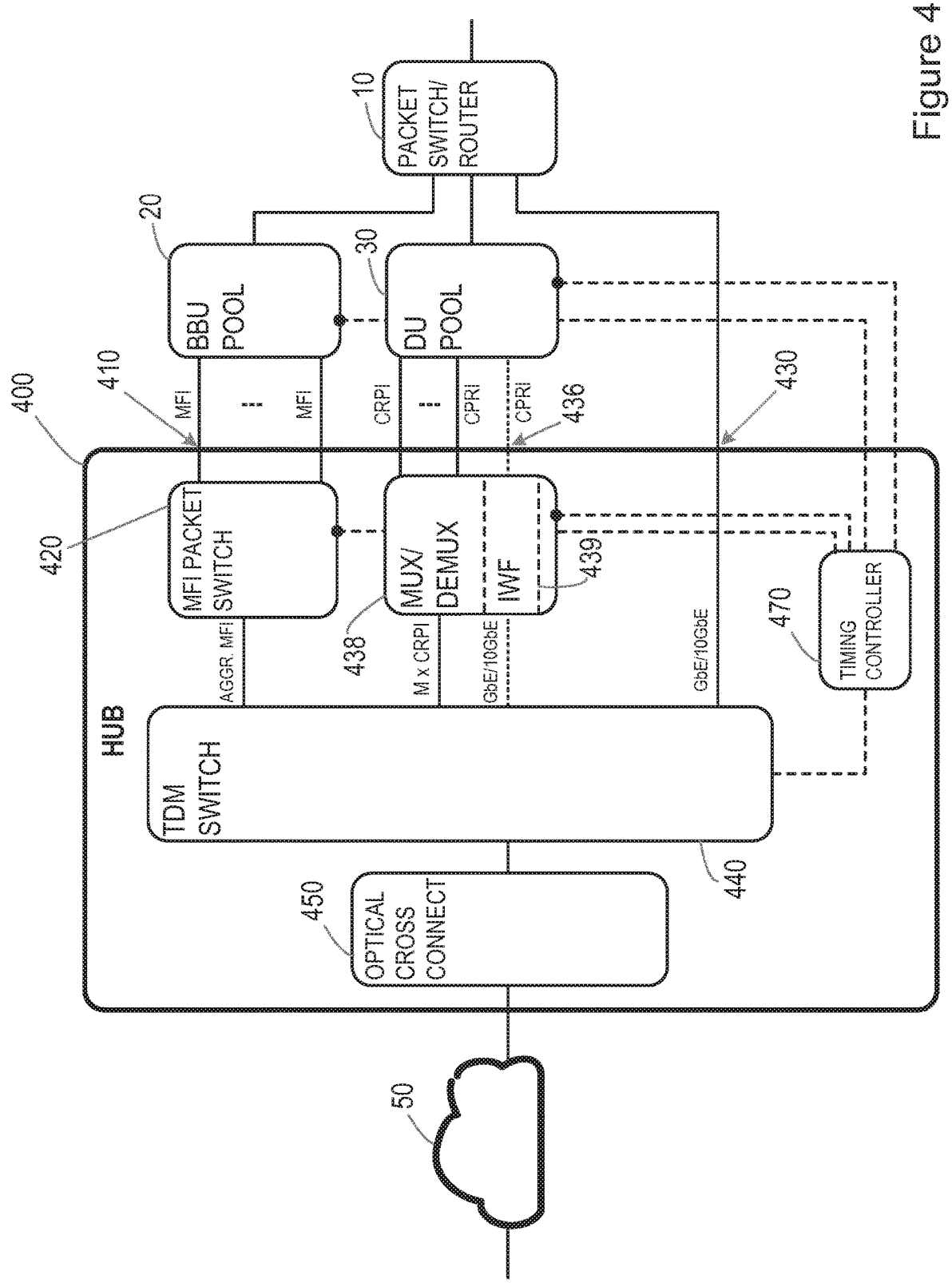
FIG. 4 is a block diagram illustrating a hub node.

The switching apparatus further comprises an interface 250 configured to format the combined data signal for transmission over the transport network 50 and to forward the formatted combined data signal to the transport network. The interface 250 may provide for a configurable format of the data signal for transmission over the transport network, e.g. selection of an optical channel or wavelength for transmission. The transport network may comprise a circuit switched channel, e.g. an optical channel. A format of the second data type (e.g. Ethernet) is maintained. As discussed above, the transport network may comprise an OTN or an OTN-like container, and the interface may be configured to format the combined data signal for transmission over the transport network. For example, the formatting may be by assigning reconfigurable wavelengths to frames of the combined data signal, or by performing other formatting appropriate to the technology of the transport network. In some examples of the disclosure, as illustrated in FIG. 4, at least some of the functions of the interface 250 may be incorporated into the multiplexing switch 240, such that at least some of the formatting for transmission over the transport network is conducted within the multiplexing switch 240. Alternatively, the formatting comprises using a predetermined or static format for transmission.

As discussed above with reference to the method 100, the switching apparatus 200 may be further configured to perform steps facilitating receipt of a combined data signal, extraction of the component data signals and switching of the component data signals to their intended recipients. For example, the switching apparatus 200 may function as a receiving one of the hub node and remote node.

For example, and referring still to FIG. 3, the switching apparatus 200 may further comprise a port 252 configured to receive a combined data signal from the transport network 50. The interface 250 may be configured to format the received signal for processing and the multiplexing switch 240 may be configured to demultiplex the formatted received signal into a first data signal 254, a second data signal 256 and a third data signal 258, and to forward the first data signal to the first switch 220, the second data signal to the second switch (if present, not illustrated in FIG. 3), or to the port 230 configured to receive the second data signal, and the third data signal to the third switch 238. The first switch 220 may be configured to disaggregate the first data signal 254 into a plurality of first data signals, and determine the output port for a particular packet. For example, the determination of the output port is based on packet switching, for example using packet header inspection, to output the plurality of first data signals to the corresponding plurality of ports 210. The third switch 238 may be configured to demultiplex the third data signal 258 into a plurality of third data signals and to output the plurality of third data signals to the plurality of ports 236. The third switch may use predetermined time division multiplexing slots to switch each of the third data signals to the appropriate output port. The multiplexing switch 240 may be configured to demultiplex the formatted received signal by, for a frame of the formatted received data signal, extracting a packet to the first data signal from a portion of the frame reserved for the first data signal, extracting a packet to the third data signal from a portion of the frame reserved for the third data signal and extracting packets to the second data signal from a remaining portion of the frame.

FIG. 4 illustrates an example of a switching apparatus such as the apparatus 200 of FIG. 3 when configured to act as a hub node 400, which may be an example of the hub node 40 of FIG. 1. Aspects and functions of the switching apparatus 200 are applicable to the hub node 400 unless otherwise described. Referring to FIG. 4, the hub node 400 comprises a first switch in the form of an MFI packet switch 420, a third switch in the form of a MUX/DEMUX 438, which may be configured to multiplex/demultiplex CPRI or other radio data signals, a timing controller 470, a multiplexing switch in the form of a TDM switch 440 and an interface 450 in the form of an optical cross connect. The MFI packet switch 420 receives MFI data signals from a plurality of modified RECs, or BBUs 20, via a plurality of first ports 410. The MFI packet switch 420 then aggregates and switches MFI data from/to the BBUs.

In some examples, the switch 420 may support newly defined tools specified by the IEEE TSN WG. The MFI packet switch 420 is connected to the timing controller 470 to enable support of Time Sensitive Networking (TSN) functions, for example via IEEE1588. The timing controller may also support or manage statistical multiplexing within the MFI packet switch to ensure that a delay specification for the MFI data signals, received by the timing controller from the BBU pool 20, is respected. In alternative examples, all aspects of complying with a delay specification may be handled between the timing controller and the TDM switch 440. The aggregated MFI traffic signal output from the MFI packet switch is in data packet (e.g. Ethernet) form, and is composed of regular transmission of packets, e.g. synchronized with a reference timing signal provided by the timing controller 470. As the timing controller 470 also provides the reference timing signal to the TDM switch 440, the output aggregated MFI data stream is also synchronized with the TDM switch 440.

The MUX/DEMUX 438 receives radio signals, e.g. CPRI data signals, from a pool of DUs 30, via third ports 436. The MUX/DEMUX then multiplexes the CPRI signals. The MUX/DEMUX 438 is also connected to the timing controller 470, ensuring that the output of the MUX/DEMUX 438 is synchronized with the timing reference signal.

The outputs from the MFI packet switch 420 and MUX/DEMUX 438 are input to the TDM switch 440, together with packet backhaul traffic received from the packet router 10 via a second port 430. The TDM switch 440 buffers each input signal to accommodate any difference between the input signal clock and the timing reference signal (for example in the case of Ethernet traffic received from the packet router 10 and which is not already synchronised with the TDM switch via the timing reference signal). The buffering also serves to set a delay to a value communicated by the timing controller as consistent with the delay specifications for the delay sensitive MFI and CPRI traffic. The buffering capacity at an ingress port of the TDM switch may be dimensioned appropriately for available bandwidth in TDM frames as compared with incoming line speeds from the packet router 10, MFI packet switch 420 and MUX/DEMUX 438.

Figure 5:
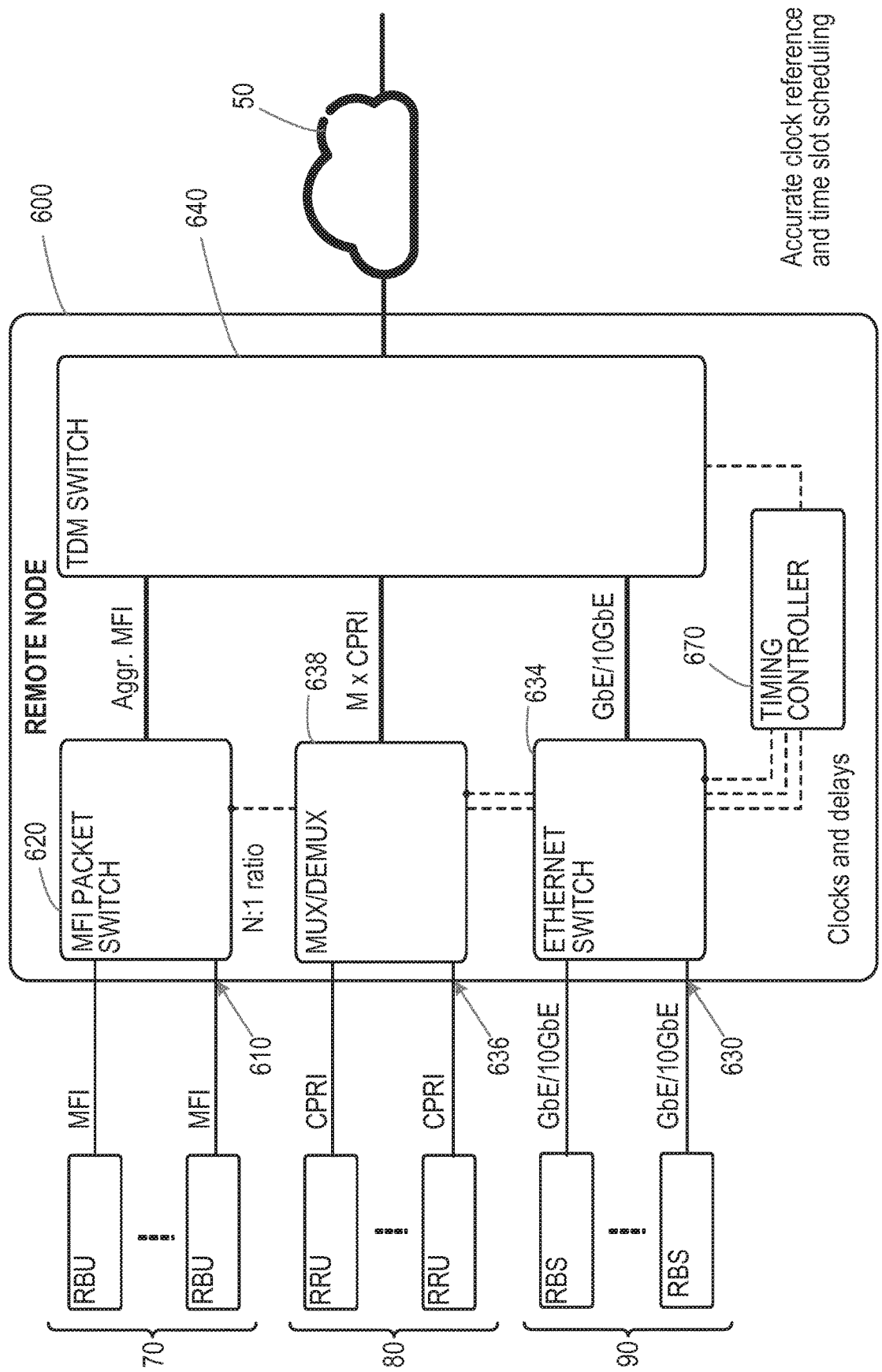
FIG. 5 is a block diagram illustrating a remote node.

FIG. 5 illustrates another example of a switching apparatus such as the apparatus 200 of FIG. 3 when configured to act as a remote node 600, which may be an example of the remote nodes 60 of FIG. 1 and may cooperate with the hub node 40, 400 of FIGS. 1 and 4. The remote node 600 comprises complementary functions to the hub node 40, 400, including optionally an interface (not shown) which may be in the form of an optical cross connect for an optical transport network. The remote node may include any corresponding function described above.

The remote node 600 comprises a multiplexing switch in the form of a TDM switch 640. The remote node 600 further comprises a first switch in the form of an MFI packet switch 620, arranged to communicate fronthaul data with a plurality of RBUs 70 via a plurality of first ports 610. The remote node 600 further comprises a third switch in the form of a MUX/DEMUX 638, arranged to communicate fronthaul data with a plurality of RRUs 80, via plurality of third ports 636. The remote node 600 further comprises a second switch in the form of a data packet (e.g. Ethernet) switch 634, arranged to communicate backhaul data with a plurality of RBS 80, via plurality of second ports 630. The remote node 600 further comprises a timing controller 670.

The TDM switch 640 is configured to receive an input signal from the transport network 50, optionally via an interface (not shown), and convert the input signal to data packet format (and CPRI format if this traffic is carried in separate lambdas). The TDM switch 640 then separates out the aggregated MFI traffic, the CPRI traffic and the data packet backhaul (e.g. Ethernet) traffic streams (i.e. first, second and third data signals) by extracting packets from the appropriate time slots reserved for the time sensitive traffic, and from the rest of each frame for the Ethernet traffic. This is the reverse of the process for combining signals performed when the switching apparatus is operating as a transmitting unit, which combining process is described in greater detail with reference to FIGS. 6a and 6b below. The TDM switch 640 selects the most accurate clock among the inputs and provides it as a reference clock to the timing control.

The remote node 600 comprises dedicated switches 620, 638 and 634 for the first, second and third data signals respectively. The aggregated and/or multiplexed signals are separated in the dedicated switches 620, 638 and 634 and are then forwarded to the individual RBUs 70, RRUs 80 and/or RBSs 90.

Thus, the fronthaul data packets received in one or more frame are identified by the TDM switch as being of the first, second or third type (e.g. according to the time slot in which they are received). The data signals of a particular type are forwarded to the corresponding dedicated switch 620, 638 and 634. The dedicated switch 620, 638 and 634 is configured to demultiplex the received signal of a single type, and communicate that signal to the destination radio equipment (e.g. RBU, RRU, RBS). For example, the packet switch 620, 634 may use a packet header to identify and switch the packets to their destination. The demultiplexing by the dedicated switches 620, 638 and 634 may be over one or more frames.

The remote node also functions to multiplex data from RE towards the core network, e.g. aggregating first in the dedicated switch 620, 638 and 634 (first stage), and multiplexing different types of signals in the same frame in the TDM switch 640 (second stage). The frames are then transmitted over the transport network 50 to the hub node.

The system architecture illustrated in FIG. 1 is optimised for a direct link connection to the remote nodes 60, 600. However, due to the standard mapping of Ethernet over the transport network, e.g. an OTN network, the system also allows for an intermediate Ethernet switch or switches. Such switches may be incorporated on condition of compliance with network design rules (for example a maximum of 3 hops) and support for proper TSN functionality. When intermediate standard packet (e.g. Ethernet) switches are implemented, the synchronous-regular packet traffic mapping would be interrupted (this can be easily detected by the remote node). However the timing critical packets should still receive limited PDV (for example of less than 5 μs) if network design is done properly. The additional PDV would be handled by the remote node. As discussed above, synchronisation is shared with the remote nodes via a SyncE network and a IEEE1588 profile/architecture which depends on the target requirements. For the most stringent applications, a requirement for better than 100 ns accuracy can be met by a properly designed network.

Operation of the TDM switch 440 is described in detail with reference to FIGS. 6a and 6b below, and results in a combined output signal which is forwarded to the interface 450 before being sent via the transport network 50 to the appropriate remote node or nodes. In some examples, the interface 450 may be an optical cross connect, as mentioned above.

The timing controller 470 supports all the timing functions in the hub node 400, providing the timing reference signal used to ensure synchronous traffic. In addition, in some examples, the timing controller 470 may compare the delay specifications of all the input signals, received for example from the BBU pool 20 and DU pool 30, and accordingly schedule the time slots in the TDM switch 440 to ensure compliance with the received delay specifications. In other examples, the scheduling function may be entirely embedded in the TDM switch, with the timing controller merely supplying the reference timing signal. The timing controller 470 also implements synchronization (e.g. SyncE and/or IEEE1588) capabilities in order to support synchronous operation of the radio (e.g. CPRI) traffic, for supporting scheduling of all Radio traffic (for alignment with radio transmission) and TSN tools.

The TDM switch 440 and timing controller 470 may apply principles set out in IEEE standards document 802.1.Qbv in multiplexing the signals received from the MFI packet switch 420, MUX/DEMUX 438 and packet router 10, as illustrated in FIGS. 6a and 6b.

The first stage switches, e.g. BBU pool 20 and/or DU pool 30 are connected to the packet switch/router 10. This allows communication of baseband processed signals from an RE to be transmitted to the core network as backhaul by the packet switch/router 10. Similarly, the packet switch/router 10 transmits data packets from the core network to the BBU pool 20 and/or DU pool 30, for generation of the radio signals to be transmitted over an air interface by an RE. The RE may provide a cell connected to one or more User Equipment (e.g. mobile phone) or wireless device.

It will be appreciated that the system of FIG. 1, and elements illustrated in FIGS. 4 and 5, have been discussed with reference to traffic flow from a core network towards remote units. Complementary functions may be performed for traffic flow from the remote units to the core, as discussed above with reference to FIGS. 2 and 3.

FIGS. 6a and 6b illustrate one way in which the multiplexing switch 240, which may for example be implemented as TDM switch 440, 640, allocates time slots in a combined signal frame. The time slots may be allocated at a multiple of the timing reference signal provided by the timing controller 470, based on information provided by the timing controller for each input client. The multiple may be one or more instances of the timing reference signal. This allocation process is performed when the switching apparatus 200, which may be configured as a hub node 400 or remote node 600, is operating as a transmitting element, forwarding traffic to the transport network for transmission.

Referring to FIG. 6a, the TDM switch 240, 440, 640 receives first, second and optionally third input data signals for example in the form of an aggregated MFI signal 254, an Ethernet signal 256 and a multiplexed CPRI signal 258. The TDM switch 240, 440, 640 outputs a combined signal 260 for transport over the transport network, which may for example be an Ethernet signal encapsulated for OTN.

As shown in FIG. 6b, in each frame of the output signal (e.g. Ethernet/OTN), the TDM switch 240, 440, 640 allocates data 510 (e.g. a packet 510a) from the aggregated MFI data stream to a time slot 540a which is reserved for MFI data. In some examples, the TDM switch 240, 440, 640 allocates a portion, for example a packet 520a from the radio data (e.g. CPRI) stream e.g. following IWF conversion, to a time slot 550a reserved for this type of radio (e.g. CPRI) data. The TDM switch 240, 440, 640 then fills the rest of the frame 560, e.g. as a further time period 560, with data 530 from the packet data backhaul (e.g. Ethernet) stream. Each time slot 540a, 550a or further time period 560 contains only one type of data signal, e.g. first, second or third data type. The frame may further comprise overhead (OH), e.g. for routing and/or error correction.

Each reserved slot 540a, 550a, e.g. for MFI data or CPRI data, is separated from the next reserved slot for that data type 540b, 550b by a multiple of the timing reference signal T. By separating the different signal types in this way, the TDM switch 240, 440, 640 enables control of the specific latency requirement for each traffic typology. The TDM switch may be guided in its selection of packets from the MFI and CPRI streams by the timing controller 270, 470, 670, to ensure compliance with the various delay specifications which the timing controller receives from the BBU pool and DU pool. Further data 510b, 520b may be transmitted later in the same frame, or in a later frame, e.g. in slots 540b, 550b. Each reserved slot 540a, 550a may comprise data for/from one or a plurality of radio equipment (e.g. RRU, RBU, RBS). As such, each reserved slot 540a, 550a or remainder 560 may comprise data received/transmitted on one or a plurality of the first ports; or one or a plurality of the second ports; or one or a plurality of the third ports.

The TDM switch 240, 440, 640 maintains the packet (e.g. Ethernet) format for possible integration of Ethernet TSN switches in the cloud between the hub node 400 and the remote nodes 60. VLAN may be used to identify a specific flow, including packetized CPRI, MFI, Ethernet etc, such that it is possible to differentiate between individual flows within a single traffic type. The Ethernet switching functionalities also support new bridging tools, being defined by IEEE, to cope with stringent Fronthaul requirements, including for example the IEEE 802.1.Qbv and .qu tools.

In some examples, the TDM switch 240, 440, 640 implements a standard OTN framing with synchronous mapping in accordance with ITU-T recommendation G.709. This mapping allows the addition of an optional FEC. The TDM switch may allocate a separate frame/lambda for legacy CPRI traffic.

As discussed above, all input data into the TDM switch 440, 640 may be Ethernet based, for example if CPRI traffic is converted to Ethernet format in IWF 439 of the MUX/DEMUX (IWF not illustrated in the MUX/DEMUX 638 of FIG. 6). Alternatively, some input data may be CPRI based, in examples in which this traffic is to be carried in separate lambdas. Such traffic may be mapped according to the Supplement to ITU-T G-series Recommendations—CPRI over OTN (for example section 8, Multiple CPRI option 3, 4 or 5 signal mapping into ODU2r).

Packets relating to the timing sensitive data are allocated by the TDM switch 240, 440, 640 at synchronous time slots, allowing all data to be mapped according to a fixed slot of a fixed size or multiple of a fixed size corresponding to CPRI and MFI timing sensitive packet size. In practice a regular and periodic structure of the Ethernet frame is available at the input of the TDM switch 240, 440, 640 as a consequence of both the actions of the timing controller 470, 670 in controlling the MFI packet switch and MUX/DEMUX, and of buffering actions at the ingress port of the TDM switch.

Existing CPRI traffic may be mapped as packets into the transport container, e.g. via Pseudo Wire Emulation (PWE) or IWF, as defined for example by IEEE 1904.3 and IEEEE 802.1CM, associating a timestamp for proper handling at the radio side, and carried over the same lambda as other packet based traffic. Nevertheless, CPRI traffic is considered to be of a different type to the packet fronthaul traffic referred to as MFI, which is natively a packet fronthaul interface. Ethernet traffic may then be mapped according to an OTN standard framing as set out in G.709, for example via a BMP mapping in the OTN frame (for example 10G LAN→BMP→OPU2e→OTU2e) for guaranteed timing performance. The use of a standard OTN framing also allows for FEC support.

Symmetric transmission should be guaranteed for CPRI traffic via proper scheduling at the end nodes, and MFI traffic should also have associated timestamps for proper scheduling, unless this will be taken care by higher level (Radio) protocols.

Figure 7:
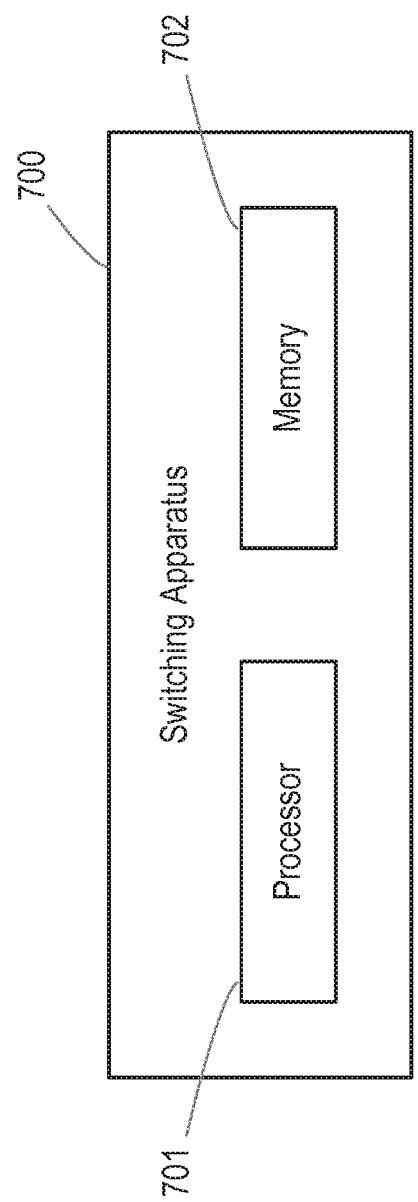
FIG. 7 is a block diagram illustrating functional units in another example of switching apparatus.

FIG. 7 illustrates another example of switching apparatus 700 which may implement the method 100 or any node described, for example on receipt of suitable instructions from a computer program. Referring to FIG. 7, the switching apparatus 700 comprises a processor 701 and a memory 702. The memory 702 contains instructions executable by the processor 701 such that the switching apparatus 700 is operative to conduct some or all of the steps of the method 100.

The method 100 may be implemented, for example using switching apparatus 200 or 700, in a system for exchanging data signals. The system may for example comprise a first switching apparatus acting as a hub node, a second switching apparatus acting as a remote node and a transport network coupled between the first apparatus and the second apparatus, as illustrated in FIG. 1.

Aspects of the present disclosure thus provide a layered switching architecture and method in which a plurality of inputs of different signal types may be combined for transmission over a transport network. The method and apparatus support both "legacy" CPRI traffic and packet MFI traffic between modified REs and RECs (with L1 processing conducted at the modified RE). Jitter performance is assured by having each signal type managed by a dedicated input switch, and strict delay and jitter requirements for the time sensitive CPRI and MFI traffic are respected, while also ensuring bandwidth efficiency through the construction of a large aggregate pipe formed of multiple small rate signals. The reuse of a standard signal format, for example Ethernet and OTN, allows for standardized OAM operations as well as interworking with Ethernet (TSN) switched networks and OTN networks.

The layered architecture proposed in examples of the present disclosure allows for different levels of prioritization and multiplexing at packet level (when feasible), at time slot level, and at wavelength level (for example if timing characteristics cannot be met with the previous options). Packet level optimisation and prioritisation may take place via the dedicated switches of stage 1 of the layered architecture presented in the present disclosure. For example, aggregation at a packet level may take place in the first switch 220 of the apparatus 200, which may be a MFI switch 420, 620. This aggregation may include statistical multiplexing, offering important bandwidth efficiencies. Additional stage 1 optimisation may take place in the third switch 238, which may be a MUX/DEMUX 438, 638, and in the second switch, if present. Time slot level optimisation and prioritisation may take place in the multiplexing switch 240, of stage 2, which may be implemented as a TDM switch 440, 640. By allocating traffic of first and third signal types (if present) to reserved time slots, and filling the rest of a frame with traffic of a second data signal type, efficient resource usage is paired with efficient combination of different signal types, allowing for the respect of delay requirements which may apply to the first and third signal types. Wavelength level prioritisation and optimisation may take place in the interface or multiplexing switch that performs the formatting of stage 3 to prepare signals for transmission over the transport network. The possibility of segregating different vendor or synchronization domains also ensures that such entities can independently apply their policies (for example regarding an acceptable number of rejected packets) in the switches of the first stage. Each vendor only needs to communicate to the timing controller a minimal set of data constituting the delay specification for time sensitive data. This may include for example delay and delay variation values.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for switching data signals transmitted over a transport network; the method comprising:
 receiving a plurality of input data signals of a first signal type, wherein the plurality of data signals of the first signal type comprises data signals exchanged between a Radio Equipment (RE) and a Radio Equipment Controller (REC);
 aggregating the plurality of input data signals into an aggregated first data signal;
 receiving a second data signal of a second signal type different to the first signal type;
 receiving a plurality of input data signals of a third signal type, different to the first and second signal types;
 multiplexing the plurality of input data signals of the third signal type into a third data signal; and multiplexing the aggregated first data signal with the second data signal and the third data signal to form a combined data signal; and forwarding the combined data signal to the transport network;

wherein multiplexing the first data signal with the second data signal and the third data signal comprises, for a frame of the combined data signal:

allocating the first data signal to a portion of the frame reserved for the first data signal;

allocating the third data signal to a portion of the frame reserved for the third data signal; and allocating the second data signal to a remaining portion of the frame, wherein the plurality of data signals of the first signal type are subject to a delay specification, the plurality of input data signals of a third signal type are subject to a delay specification, and the second data signal of the second signal type is not subject to the delay specification.

2. A method as claimed in claim 1, wherein the aggregated first data signal and the combined data signal are synchronised with a reference timing signal, wherein multiplexing the aggregated first data signal with the second data signal to form a combined data signal comprises performing time division multiplexing of the aggregated first data signal with the second data signal.

3. A method as claimed in claim 1, wherein the plurality of data signals of the first signal type and/or the data signal of the second signal type comprise packet data signals.

4. A method as claimed in claim 1, wherein the second data signal comprises a data signal exchanged between a Radio Base Station (RBS) and a core network.

5. A method as claimed in claim 1, wherein the second data signal comprises a plurality of sub-signals, and wherein the method further comprises:

assembling the sub-signals to form the second data signal.

6. A method as claimed in claim 1, further comprising formatting the combined data signal for transmission over the transport network.

7. A method as claimed in claim 1, wherein the transport network comprises an optical network.

8. A method as claimed in claim 6, wherein the transport network comprises an optical network; and wherein formatting the combined data signal for transmission over the transport network comprises assigning reconfigurable wavelengths to frames of the combined data signal.

9. A method as claimed in claim 1, wherein aggregating the plurality of input data signals of the first signal type into an aggregated first data signal comprises performing statistical multiplexing of the plurality of input data signals.

10. A method as claimed in claim 1, wherein the plurality of input data signals of the third signal type comprises data signals exchanged between an RE and an REC.

11. A method as claimed in claim 1, wherein the plurality of input data signals of the third signal type comprise Common Public Radio Interface (CPRI) data signals.

12. A method as claimed in claim 1, further comprising receiving a combined input data signal and separating the combined input data signal into a first input data signal comprising the plurality of input data signals of a first signal type, a second input data signal comprising the data signal of a second signal type and a third input data signal comprising the plurality of input data signals of the third signal type.

13. An apparatus for switching data signals transmitted over a transport network, the apparatus comprising:

a plurality of first ports configured to receive a plurality of input data signals of a first signal type which are exchanged between a Radio Equipment (RE) and a Radio Equipment Controller (REC);

a first switch configured to aggregate the plurality of input data signals into an aggregated first data signal;

a second port configured to receive a second data signal of a second signal type different to the first signal type;

a plurality of third ports configured to receive a plurality of input data signals of a third signal type, different to the first and second signal types; and a third switch configured to multiplex the plurality of input data signals of the third signal type into a third data signal;

a multiplexing switch configured to multiplex the aggregated first data signal with the second data signal and the third data signal to form a combined data signal; and an interface configured to forward the formatted combined data signal to the transport network;

wherein the multiplexing switch comprises a framer configured, for a frame of the combined data signal, to multiplex the first, second, and third data signals, wherein the framer is configured to multiplex the first, second, and third data signals by:

allocating the first data signal to a portion of the frame reserved for the first data signal;

allocating the third data signal to a portion of the frame reserved for the third data signal; and allocating the second data signal to a remaining portion of the frame, wherein the plurality of input data signals of the third signal type are subject to a delay specification, the plurality of input data signals of the third signal type are subject to a delay specification, and the second data signal of the second signal type is not subject to the delay specification.

14. The apparatus as claimed in claim 13, further comprising a timing function configured to provide a reference signal, wherein the first switch is configured to aggregate the plurality of input data signals into an aggregated first data signal which is synchronised with the reference signal, and the multiplexing switch is configured to multiplex the aggregated first data signal with the second data signal to form a combined data signal which is synchronised with the reference signal.

15. The apparatus as claimed in claim 13, wherein the second signal type is exchanged between a Radio Base Station (RBS) and a core network.

16. The apparatus as claimed in claim 13, wherein the second data signal comprises a plurality of sub-signals, and wherein the apparatus further comprises a second switch configured to assemble the sub-signals to form the second data signal.

17. The apparatus as claimed in claim 13, wherein the first switch is configured to aggregate the plurality of input data signals of the first signal type into an aggregated first data signal by performing statistical multiplexing of the plurality of input data signals.

18. The apparatus as claimed in claim 13, wherein the third data signal of the third signal type is exchanged between an RE and an REC.

19. An apparatus for switching data signals transmitted over a transport network; the apparatus comprising a processor and a memory, the memory containing instructions executable by the processor whereby the apparatus is operative to:
- receive a plurality of input data signals of a first signal type wherein the plurality of data signals of the first signal type comprises data signals exchanged between a Radio Equipment (RE) and a Radio Equipment Controller (REC);
- aggregate the plurality of input data signals into an aggregated first data signal;
- receive a second data signal of a second signal type different to the first signal type;
- receive a plurality of input data signals of a third signal type, different to the first and second signal types;
- multiplex the plurality of input data signals of the third signal type into a third data signal;
- multiplex the first data signal with the second data signal and the third data signal to form a combined data signal; and
- forward the combined data signal to the transport network;
- wherein multiplexing the first data signal with the second and third data signals comprises, for a frame of the combined data signal:
  - allocating the first data signal to a portion of the frame reserved for the first data signal;
  - allocating the third data signal to a portion of the frame reserved for the third data signal; and
  - allocating the second data signal to a remaining portion of the frame,
- wherein the plurality of input data signals of the third signal type are subject to a delay specification, the plurality of input data signals of the third signal type are subject to a delay specification, and the second data signal of the second signal type is not subject to the delay specification.

20. A system for exchanging data signals, the system comprising:
- a first apparatus as claimed in claim 13, the first apparatus configured as a hub node and operable to receive input data signals from a Radio Equipment Controller (REC) and a router;
- a second apparatus, the second apparatus configured as a remote node and operable to receive input data signals from a Radio Equipment (RE) and a Radio Base Station (RBS); and
- a transport network coupled between the first apparatus and the second apparatus,
- wherein the first apparatus is configured to transmit data signals of the first, second, and third type over the transport network to the second apparatus, and
- the second apparatus is configured to transmit data signals of the first, second, and third type over the transport network to the first apparatus,
- wherein the second apparatus comprises:
  - a plurality of first ports configured to receive a plurality of input data signals of a first signal type which are exchanged between a Radio Equipment (RE) and a Radio Equipment Controller (REC);
  - a first switch configured to aggregate the plurality of input data signals into an aggregated first data signal;
  - a second port configured to receive a second data signal of a second signal type different to the first signal type;
  - a plurality of third ports configured to receive a plurality of input data signals of a third signal type, different to the first and second signal types; and
  - a third switch configured to multiplex the plurality of input data signals of the third signal type into a third data signal;
  - a multiplexing switch configured to multiplex the aggregated first data signal with the second data signal and the third data signal to form a combined data signal; and
  - an interface configured to forward the formatted combined data signal to the transport network;
- wherein the multiplexing switch comprises a framer configured, for a frame of the combined data signal, to multiplex the first, second, and third data signals wherein the framer is configured to multiplex the first, second, and third data signals by:
  - allocating the first data signal to a portion of the frame reserved for the first data signal;
  - allocating the third data signal to a portion of the frame reserved for the third data signal; and
  - allocating the second data signal to a remaining portion of the frame,
- wherein the plurality of input data signals of the third signal type are subject to a delay specification, the plurality of input data signals of the third signal type are subject to a delay specification, and the second data signal of the second signal type is not subject to the delay specification.

21. A nontransitory computer readable storage medium comprising computer program instructions which, when executed on at least one processor, cause the at least one processor to carry out a method for switching data signals transmitted over a transport network; the method comprising:
- receiving a plurality of input data signals of a first signal type, wherein the plurality of data signals of the first signal type comprises data signals exchanged between a Radio Equipment (RE) and a Radio Equipment Controller (REC);
- aggregating the plurality of input data signals into an aggregated first data signal;
- receiving a second data signal of a second signal type different to the first signal type;
- receiving a plurality of input data signals of a third signal type, different to the first and second signal types;
- multiplexing the plurality of input data signals of the third signal type into a third data signal; and
- multiplexing the aggregated first data signal with the second data signal and the third data signal to form a combined data signal; and
- forwarding the combined data signal to the transport network;
wherein multiplexing the first data signal with the second data signal and the third data signal comprises, for a frame of the combined data signal:
- allocating the first data signal to a portion of the frame reserved for the first data signal;
- allocating the third data signal to a portion of the frame reserved for the third data signal; and
- allocating the second data signal to a remaining portion of the frame,
- wherein the plurality of data signals of the first signal type are subject to a delay specification, the plurality of input data signals of a third signal type are subject to a delay specification, and the second data signal of the second signal type is not subject to the delay specification.

* * * * *